Figure 1:
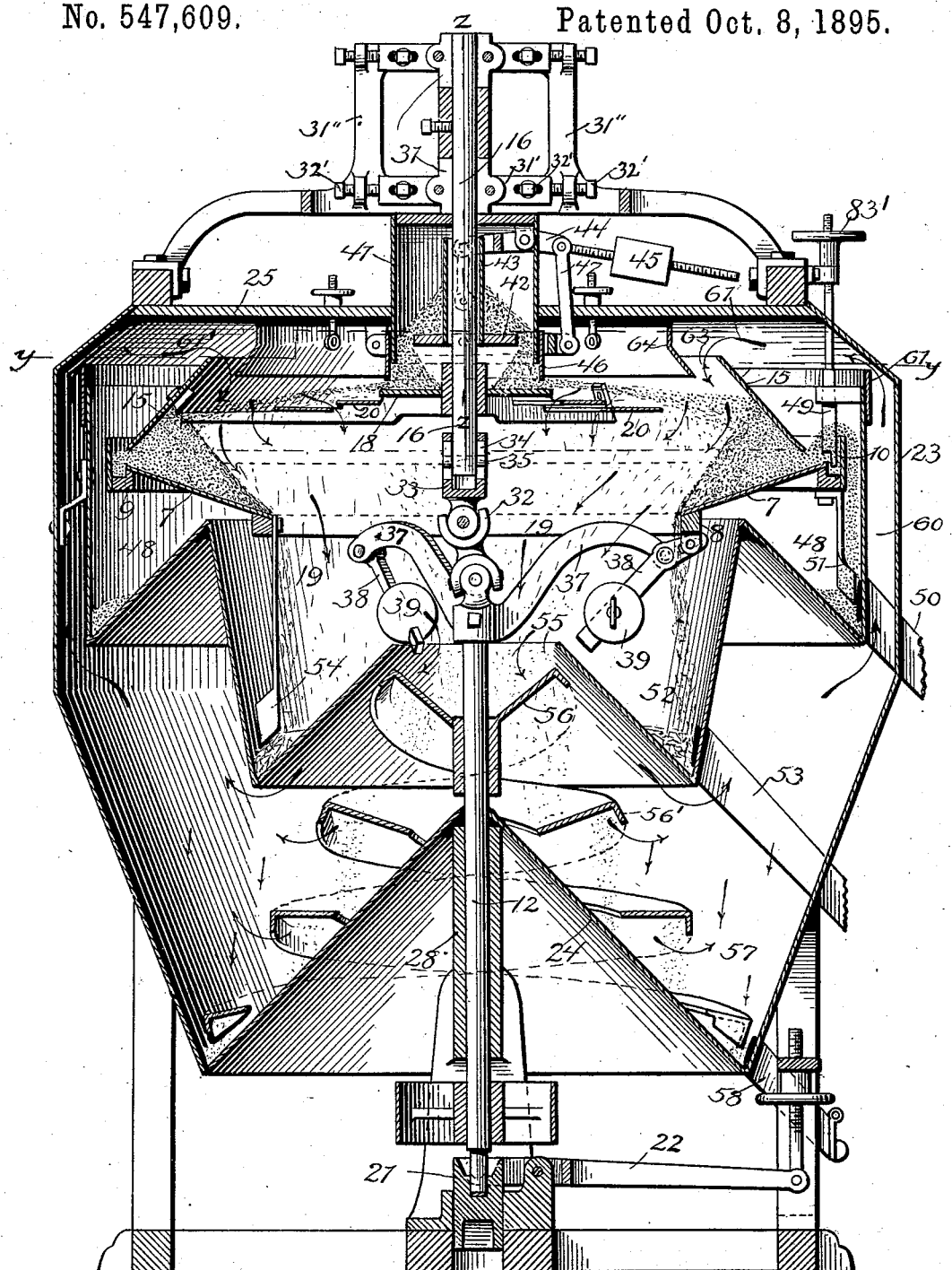

(No Model.) 10 Sheets—Sheet 1.

J. JESSEN.
APPARATUS FOR SEPARATING LIGHT MATERIAL FROM HEAVIER MATERIAL.

No. 547,609. Patented Oct. 8, 1895.

Witnesses.
Henry B. Avery
Frederick S. Lyon

Inventor.
James Jessen
By Paul Hawley
his Attorneys.

(No Model.) 10 Sheets—Sheet 2.
J. JESSEN.
APPARATUS FOR SEPARATING LIGHT MATERIAL FROM HEAVIER MATERIAL.
No. 547,609. Patented Oct. 8, 1895.

Witnesses
Henry B. Avery
Frederick S. Lyon

Inventor
James Jessen
By Paul D. Hawley
his attorneys (No Model.) 10 Sheets—Sheet 3.
J. JESSEN.
APPARATUS FOR SEPARATING LIGHT MATERIAL FROM HEAVIER MATERIAL.
No. 547,609. Patented Oct. 8, 1895.

(No Model.) 10 Sheets—Sheet 4.

J. JESSEN.
APPARATUS FOR SEPARATING LIGHT MATERIAL FROM HEAVIER MATERIAL.

No. 547,609. Patented Oct. 8, 1895.

Witnesses
Henry B. Avry.
Frederick S. Lyon.

Inventor:
James Jessen
By Paul A. Staley
his attorneys.

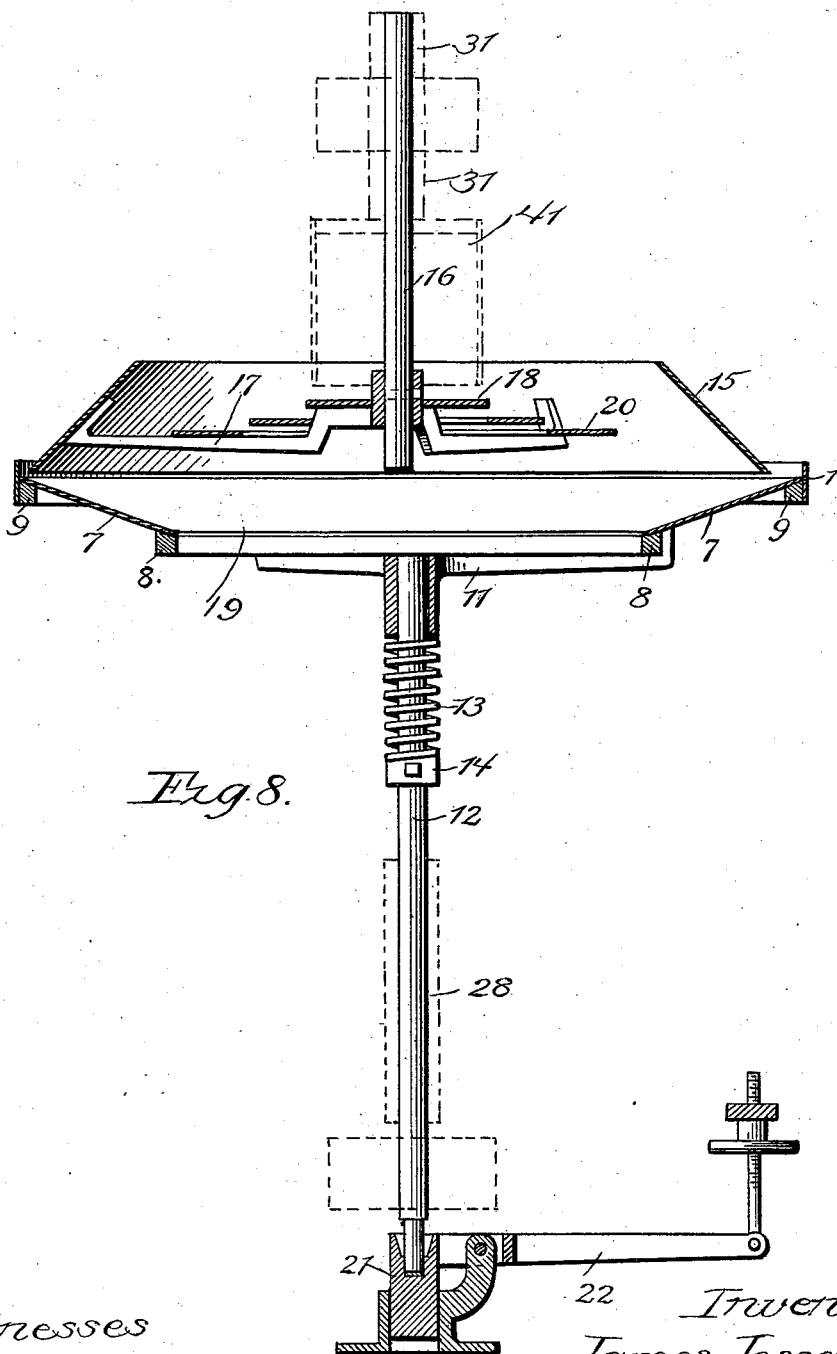

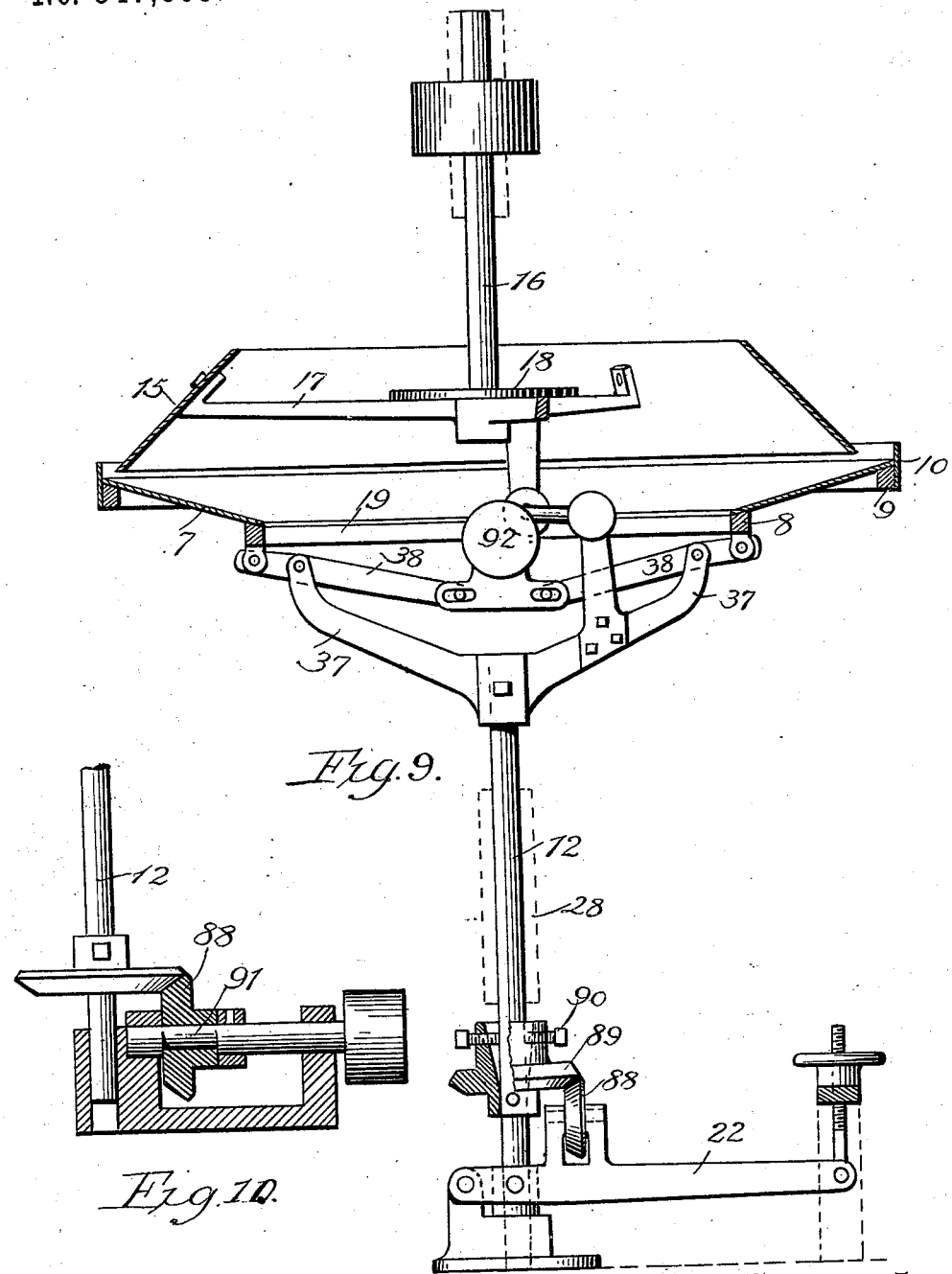

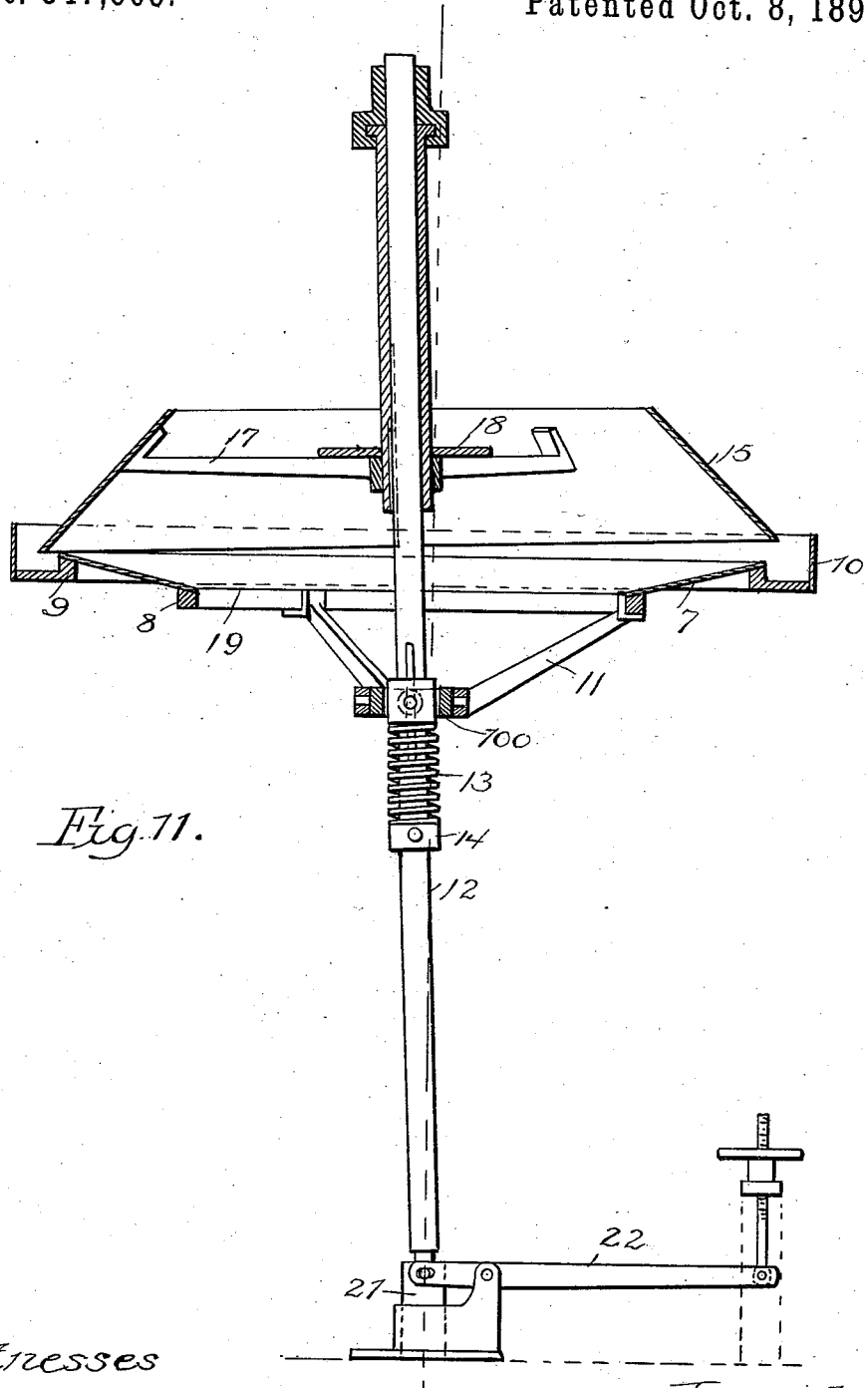

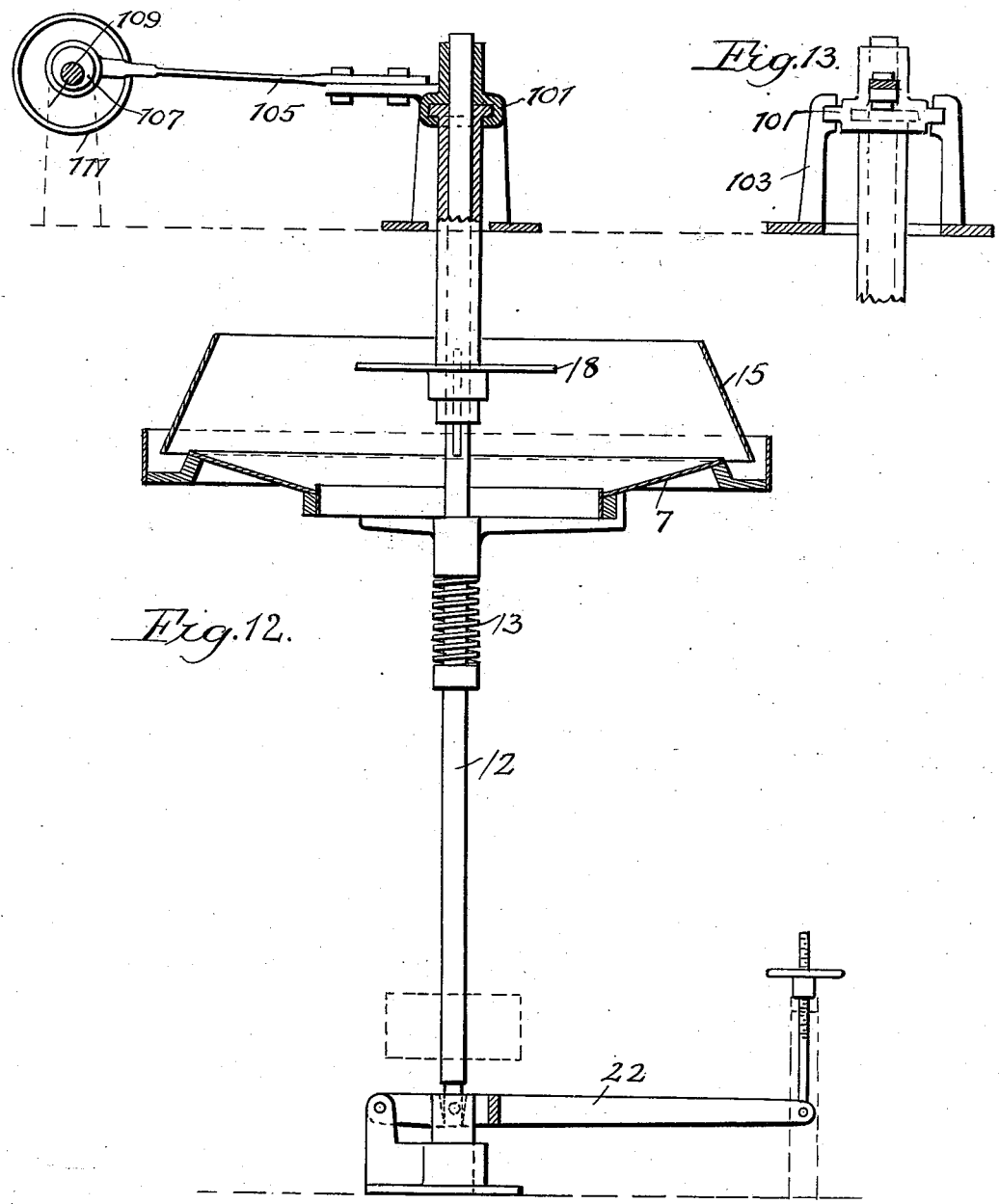

(No Model.) 10 Sheets—Sheet 9.

J. JESSEN.
APPARATUS FOR SEPARATING LIGHT MATERIAL FROM HEAVIER MATERIAL.

No. 547,609. Patented Oct. 8, 1895.

Witnesses.
Henry B. Avery
Frederick S. Lyon

Inventor
James Jessen
By Paul O. Hawley
his Attorneys.

(No Model.) 10 Sheets—Sheet 10.

J. JESSEN.
APPARATUS FOR SEPARATING LIGHT MATERIAL FROM HEAVIER MATERIAL.

No. 547,609. Patented Oct. 8, 1895.

UNITED STATES PATENT OFFICE.

JAMES JESSEN, OF MINNEAPOLIS, MINNESOTA.

APPARATUS FOR SEPARATING LIGHT MATERIAL FROM HEAVIER MATERIAL.

SPECIFICATION forming part of Letters Patent No. 547,609, dated October 8, 1895.

Application filed July 5, 1894. Serial No. 516,619. (No model.)

*To all whom it may concern:*

Be it known that I, JAMES JESSEN, of the city of Minneapolis, county of Hennepin, State of Minnesota, have invented a certain new, useful, and Improved Apparatus for Separating Light Material from Heavier Material, of which the following is a specification.

My invention relates to a method of and apparatus for separating light material from heavier material, for purifying wheat-middlings, cleaning grain, or any material made up of small particles or kernels.

The object of my invention is to provide a method of separation and a combined separator, purifier, and dust-collector, and to employ therein the forces of accelerated lateral or vertical or centrifugal motion, in connection with gravity, for separating the heavier particles from the lighter ones.

A further object is to provide for the employment of air-currents to aid in the process of purification.

A further object is to arrange the direction of the air-currents in such manner that the air shall carry the impurities and fine dust against the action of centrifugal force away from the purified material and directly into a suitable dust-collector instead of upward from the materal and against the action of gravity, as is usual, when it is continually dropping back on the clean material.

A further and general object is to provide a sieveless separator, purifier, and dust-collector having a general rotary action throughout.

My invention consists in the method or process of separation herein described and in the combination, with an imperforate tray or carrying plate or disk to receive the stock, of a retaining-wall provided at the bottom with a discharge slot or opening, and means for feeding and piling the stock upon the tray and against said wall, whereby the operation of gravity acts to settle the heavy particles upon the tray and to discharge the same through said slot or opening, while the lighter particles collect upon the top of the pile away from said wall, from thence sliding down the natural incline of the pile of stock into an independent receiver.

Further, my invention consists in the combination of the above with means for directing air-currents over the top of the pile of stock to aid in carrying the lighter particles down and away, in means for agitating the stock upon said tray to facilitate the action of gravity, and, further, in means for forcibly throwing toward and through said slot or opening the heavy particles which settle upon the tray in means for collecting the dust carried off by the air-currents and for returning the purified air to the working point above said tray, whereby the action of the air is rendered continuous, and, further, in particular constructions and in combinations, all as hereinafter described, and particularly pointed out in the claims.

My invention will be more readily understood by reference to the accompanying drawings, in which—

Figure 2:
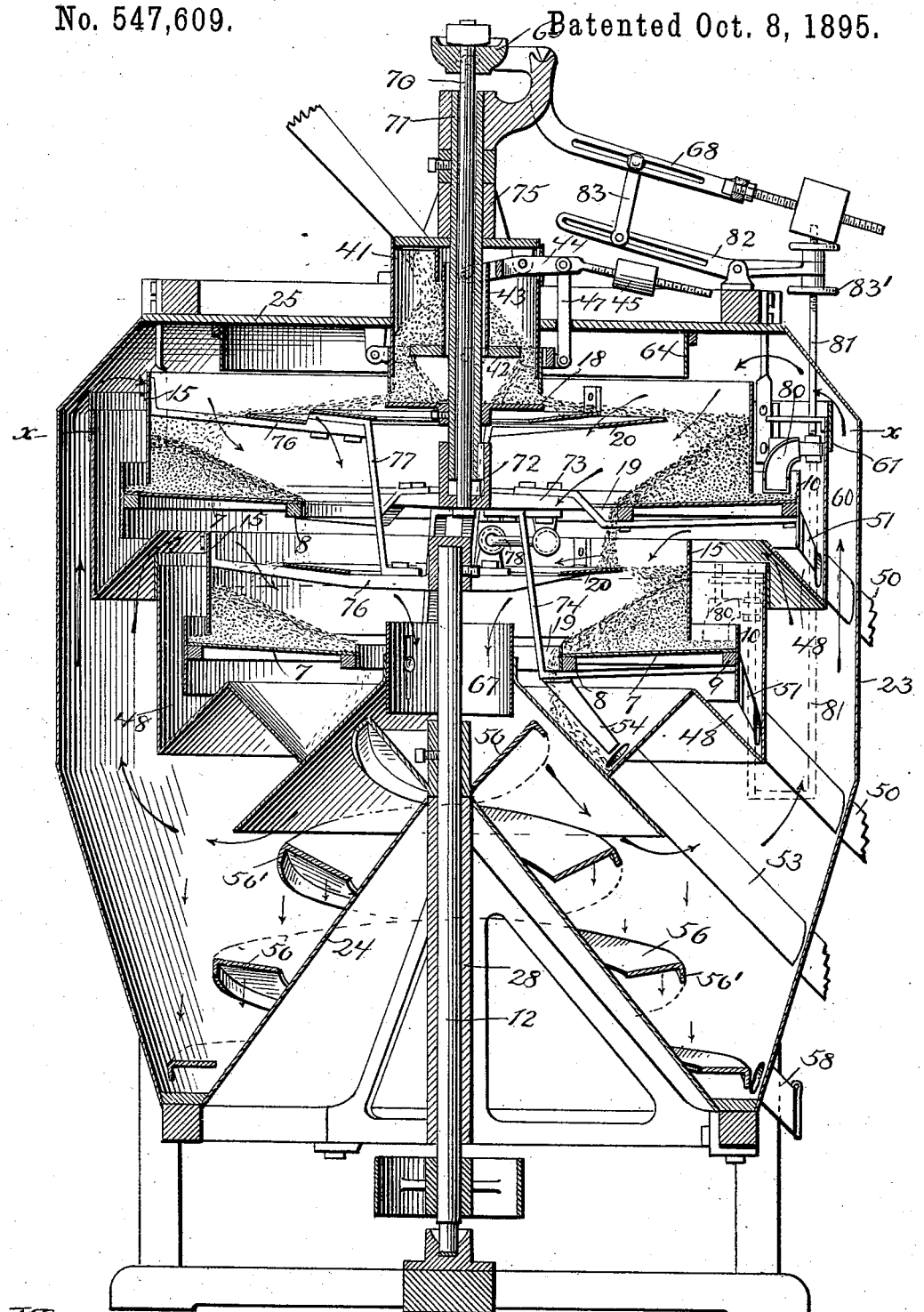
Figure 3:
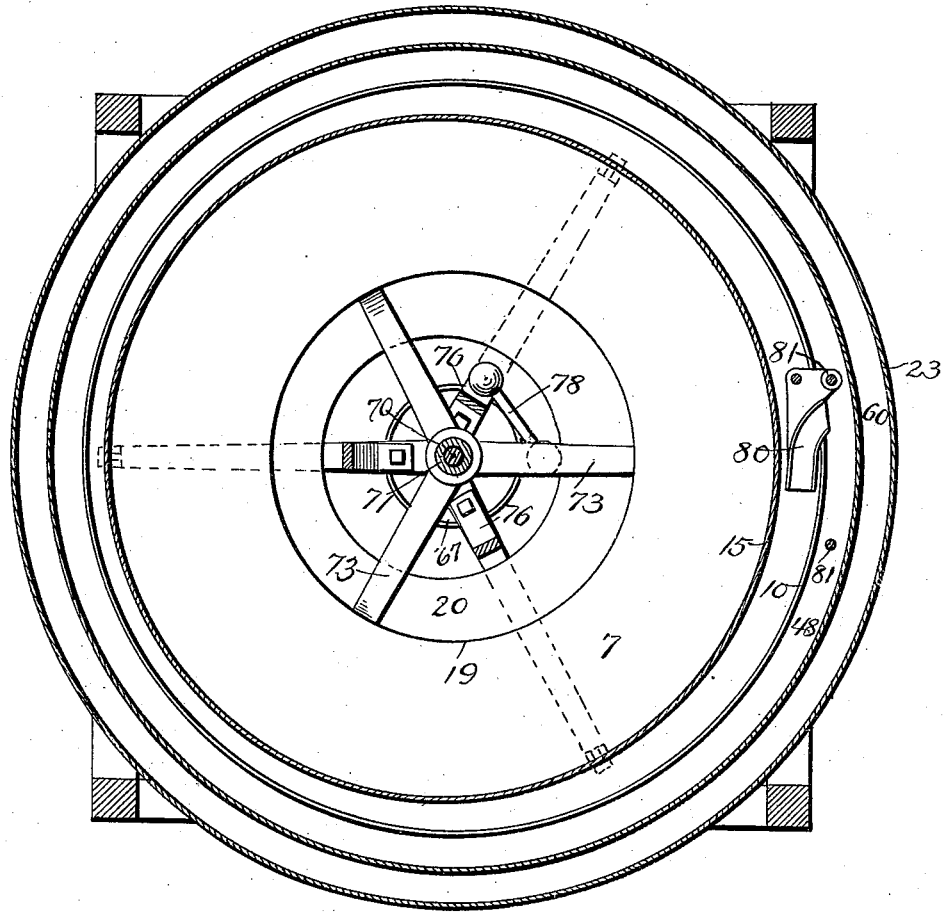
Figure 4:
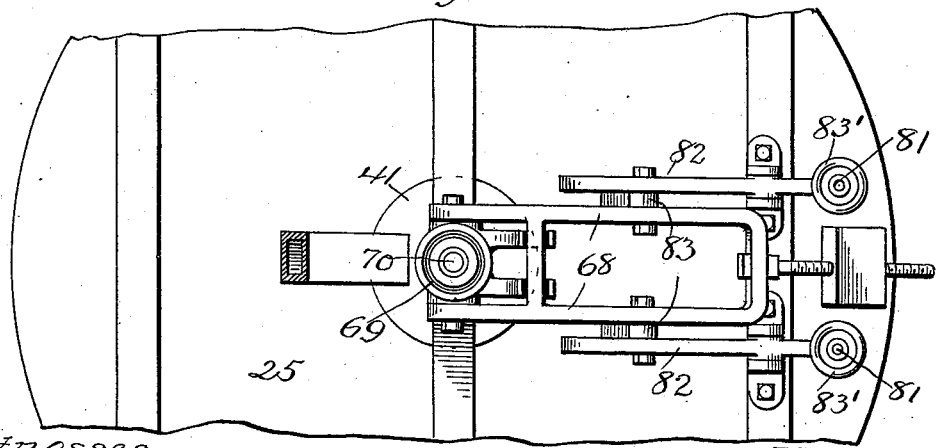
Figure 5:
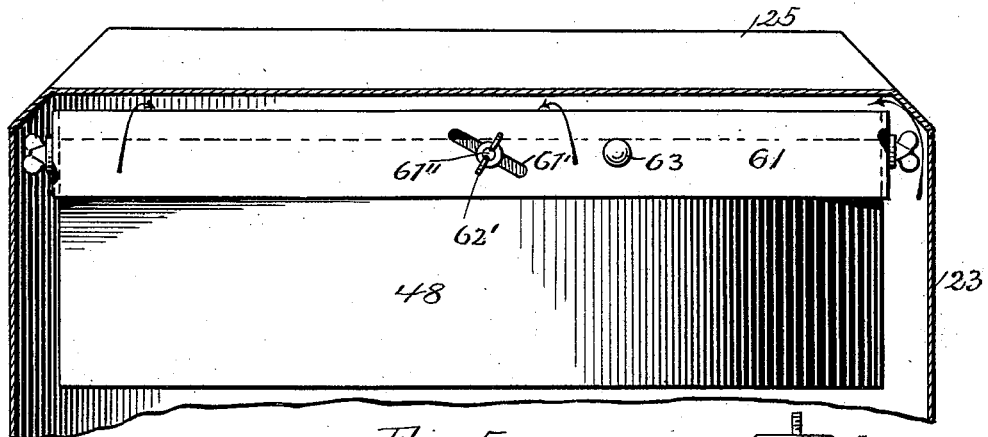
Figure 6:
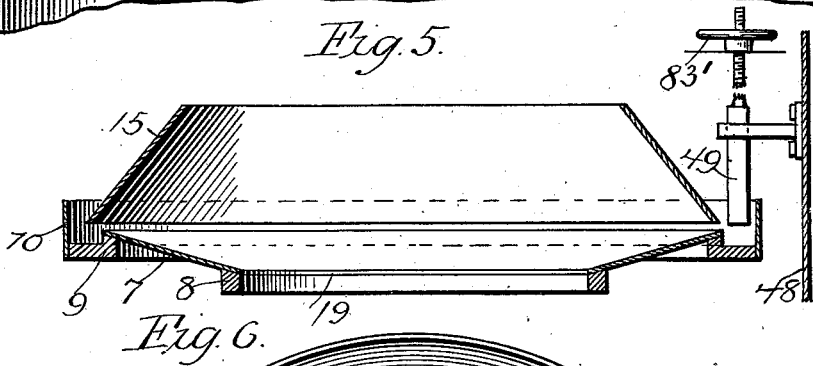
Figure 7:
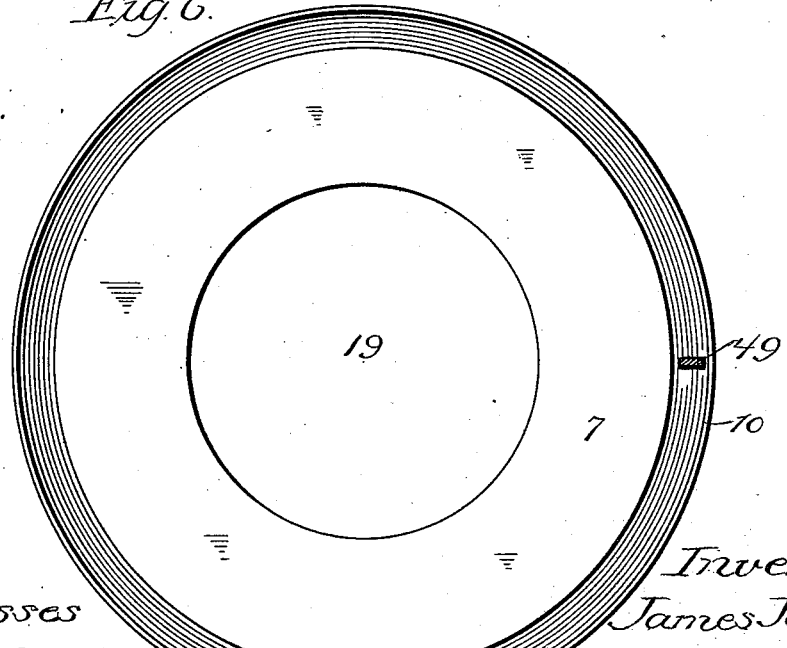
Figure 14:
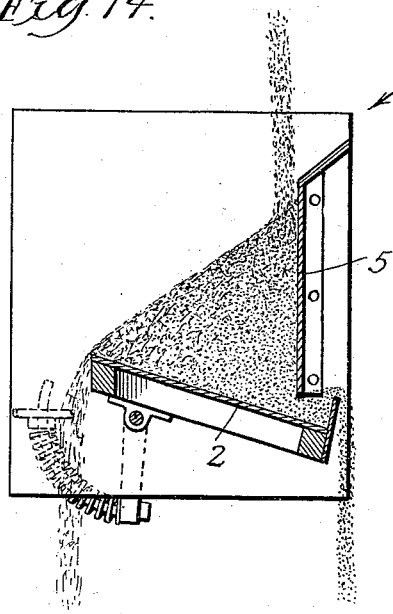
Figure 15:
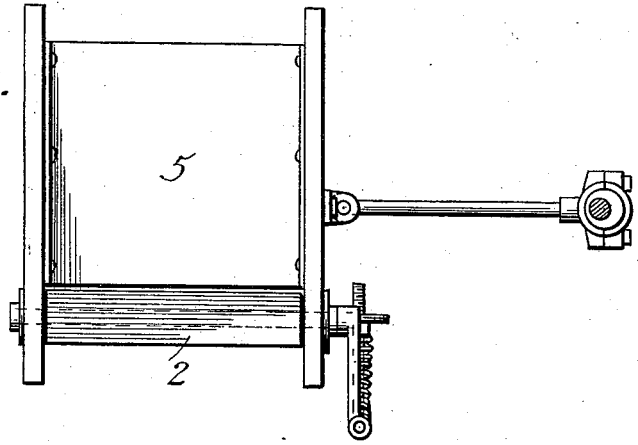
Figure 16:
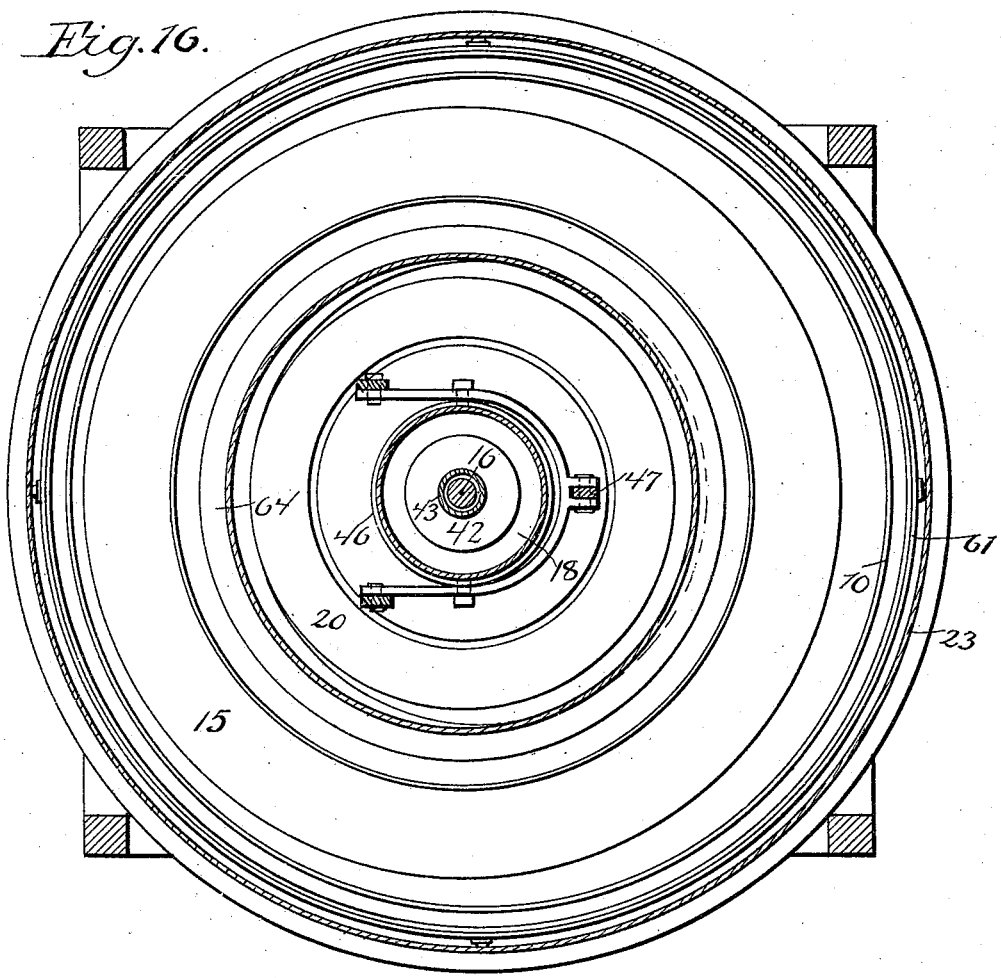
Figure 17:
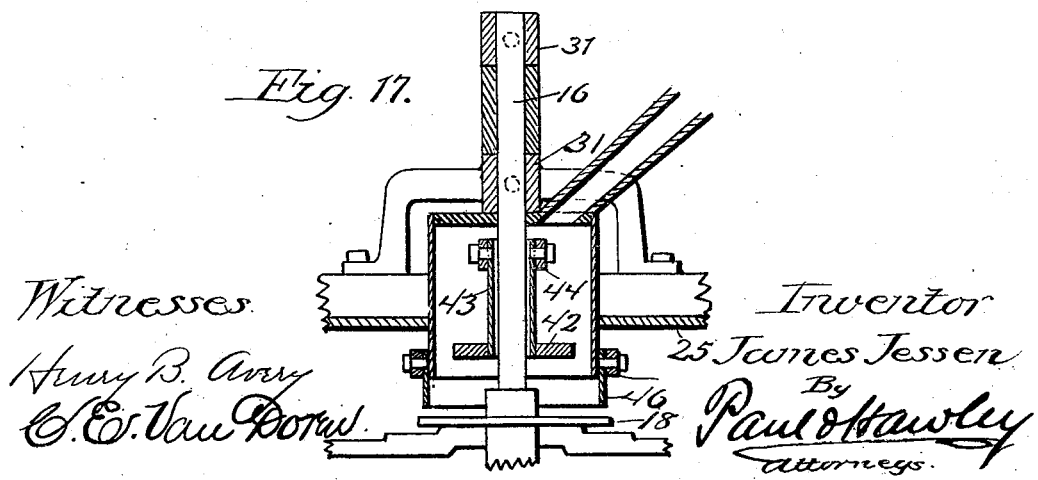

Figure 1 is a vertical section of a separator and purifier embodying my invention. Fig. 2 is a similar sectional view showing the machine in a modified form. Fig. 3 is a horizontal section on the line $x\ x$ of Fig. 2. Fig. 4 is a partial top view taken from Fig. 2. Fig. 5 is a sectional view of the top of the machine, showing the adjustable ring for regulating the air-current. Fig. 6 is a detail sectional view showing modified means for removing the purified stock from the trough at the periphery of the carrying or containing disk or tray. Fig. 7 is a top view taken from Fig. 6, the upper ring or cone being removed. Fig. 8 is a detail showing a modified movement of and means for supporting the eccentric disk and ring. Fig. 9 illustrates a further modification combining means for vibrating the tray vertically. Fig. 10 is a detail sectional view showing modified means for obtaining the same vertical vibration. Fig. 11 embodies a modification of the means for supporting and rotating the disk or tray and the ring, the principle of gyration being used. Figs. 12 and 13 show another modification. Figs. 14 and 15 illustrate the principle of my invention as applied to simple reciprocating parts. My invention is illustrated in its simplest forms in Figs. 14 and 15. Figs. 16 and 17 are detail sections taken on the lines $y\ y$ and $z\ z$ of Fig. 1.

In Fig. 14, 2 represents a receiving-tray, preferably rectangular in form, the bottom being slightly inclined. Above the tray, suitably supported, is a retaining plate or frame 5. The tray is yieldingly supported to adapt it to constantly contain a certain amount of material, and eccentrics and connecting-rods are provided for reciprocating the tray. The stock which is fed upon one end of the tray will be continually agitated by the reciprocating motion thereof, the whole body of grain being forced back and forth, the result being that the lighter particles contained in the stock will rise to the top, while the heavier particles will sink to the inclined bottom and will be discharged through the slot between the tray and the plate. The lighter particles will gradually accumulate and will be discharged over the end of the tray. The separation may be expedited, if desired, by downwardly-passing air-currents to carry off the dust and light particles. This simple reciprocating device has many disadvantages when compared to the other forms which I have illustrated, and in which continuous action is provided for and several movements employed to effectually agitate the body of middlings or other material, and in which centrifugal force acts in conjunction with gravity to effect a separation.

In Fig. 8 I have shown both an annular carrying or containing tray and an annular retaining and agitating frame or ring, obtaining the necessary reciprocating movement by arranging the tray and the ring upon separate shafts arranged eccentrically with respect to one another. While the tray and the ring remain stationary so far as their centers of rotation is concerned, the body of stock carried upon the tray will obviously be alternately though gradually forced backward and forward thereon owing to the action of centrifugal force throwing the stock against the relatively-changing eccentric walls formed by the ring. The tray consists, preferably, in the inclined and imperforate metal ring 7, around the edges of which are the light-frame rings 8 and 9, the latter carrying the vertical flange 10 and the former being mounted by means of the spider 11 upon the upper end of the shaft 12. The hub of the spider is attached to the shaft by means of a vertical wing or feather and may move up and down thereon, as the weight of material on the tray causes the compression of the spring or cushion 13, which rests upon the fixed collar 14 on the shaft. The agitating ring or retainer 15 is preferably conical in form and is supported on the lower end of the shaft 16 by means of the spider-arms 17. The stock is fed upon the circular plate 18, arranged on the top of the spider and from which the stock is thrown by centrifugal force. The stock is prevented from falling directly through the large central opening 19 in the tray by means of the step-rings 20, also supported on the spider-arms. Openings are left between the several rings, so that currents of air may pass through the same and through the thin sheet of material thrown from the revolving-plate. Separate means are provided for retaining the two shafts. For adjusting the tension of the supporting-cushion of the tray and the distance between the tray and the ring I preferably step the shaft 12 in the vertically-movable box 21 and provide the adjusting-lever 22 in connection therewith.

Referring to Fig. 1, 23 represents an annular sheet-metal casing having the conical lower walls and terminating at the bottom in the upwardly-extending cone-bottom 24. 25 represents the top of the casing, preferably closed at all points. The lower shaft 12 is preferably concentric with the casing and is held in the long vertical bearing 28 and supported in the adjustable step or journal 21, adjustable by means of a lever 22, as before described in reference to Fig. 8. The upper shaft 16 is arranged eccentrically with respect to the lower shaft and the casing, and being held in the horizontally-adjustable bearings 31 the degree of eccentricity may be varied as desired. The bearings 31 are secured to bars 31', and said bars are arranged in the frame 31''. Adjusting-screws 32' are provided for adjusting said bars and bearings, as may be required, and holding them in any position to which they may be adjusted. This upper vertical shaft is connected to the lower section of the shaft by the universal joint-coupling 32 to be driven thereby. The coupling between the universal joint and the upper shaft is preferably made with the sleeve or box 33, having the slots 34 in its sides and connected to the shaft by a cross-pin 35 therein. This connection permits free adjustment of the upper shaft, but may be replaced by a solid section, if desired. The annular tray 7, of the form before described as of the other figures, is supported upon the lower shaft to revolve therewith, the connection being made through three or more arms 37, extending from the shaft 12 and bearing upon their ends the pivoted levers 38, having a slot-and-pin fastening upon the frame-ring of the tray. On the lower end of each lever 38 I provide a preferably adjustable weight 39, whereby the lifting force of the levers may be regulated in accordance with the exact conditions of the work required of the machine. The agitating-ring 15, the spider for connecting the same with the shaft, and the step rings or plates are the same as before described in connection with Fig. 8, acting in a similar manner beneath the central feed-hopper 41.

The material enters the hopper at the top thereof. To prevent the filling up of the feed-spout in case of varying feed a regulating-plate 42 is arranged on the sleeve 43 about the shaft and connected and supported by the pivoted weight-lever 44, the weight 45 on which is adjustable. Links 44' (see dotted lines, Fig. 1) are preferably interposed between the inner end of the lever and the ring to avoid binding the sleeve on the shaft. The feed-hopper is arranged at a fixed distance above the centrifugal spreading plate or disk 18, and in order to regulate the feed from this plate I preferably provide a sliding extension 46 on the lower circular end of the feed-hopper and connect the same by means of a link or links 47 to the outer arm of the weight-lever 44. As a result, when the regulating-plate 42 is pressed down by an extra weight of material above it, the extension or ring 46 will be lifted to permit a greater amount of stock to go out through the annular opening beneath it and the plate or ring 18. In this way I avoid choking the feed. The annular trough 48 is provided beneath the periphery of the tray and the material which collects at the periphery of the tray and is thrown from the same by means of the finger or scraper 49 falls into this trough 48 and is carried around to the discharge-spout 50 by means of a suitable foot or scraper 51, depending from the edge of the tray. I preferably arrange the finger 49 directly above the discharge-spout to prevent unnecessary agitation or abrasion of the material. A similar but smaller trough 52 is arranged beneath the central opening in the tray to receive the dust and particles of light or foreign matter falling therefrom, and the material collecting in the trough is conveyed to the discharge-spout 53 thereof by a foot or scraper 54, carried upon the inner part of the tray. An opening 55 is provided within the upper and inner walls of the lower annular trough, the air being forcibly drawn down through this opening by one or more spirals 56, carried by the shaft 12, to rotate rapidly therewith, and having, preferably, the downward-projecting flanges 56'. The lower ends of the spirals extend quite close down into the bottom or lower hopper 57 of the casing wherein the fine dust drawn down with the air settles, finally passing out through a dust-discharge spout or pipe 58. An annular passage or trunk 60 is left between the annular walls of the trough 48 and of the casing, respectively, and the air first drawn down by the rotating spirals expands and rises through this annular space and passes over the adjustable ring 61 on the upper edge of the trough 48. The ring 61 is preferably provided with the inclined slots 61', to which passes the bolt 61'', upon which is a hand-nut 62'. The ring is also preferably provided with the handle 63', so that by loosening the nuts and turning the ring it can be adjusted in any desired position. The air escapes into the small chamber or space 61' above the tray and agitating-ring, passing from thence over the top of said ring and down through the annular slot or opening 63, between the same and the vertically-adjustable deflecting-ring 64. From thence the air-currents pass through the thin sheet of material through the openings between the step-rings and also down over the inclined surface of the material on the tray, carrying with them the light particles which rise to the top of the body of material and drawing the same down into the lower hopper. The stock, as it is fed from the rings 18, is thrown by centrifugal force against the ring and tray, falling at various points upon the tray and gradually working toward the periphery thereof. The tray slopes inwardly and down, in order that the progress of the heavy particles may be slow, and also to facilitate the passage of the lighter stock toward the center. As the tray and agitating-ring are revolved at the same speed and on fixed centers, it is obvious that the material will be thrown back and forth upon the tray, the movement being a gradual one and serving to settle the stock upon the tray, the light particles remaining at the top. Only the heaviest of the material lying directly upon the tray may escape through the annular slot between the periphery of the tray and the agitating-ring. The stock which does escape to the foot of the vertical flange on the tray is caught by the finger 49, and being deflected thereby will rise over the wall or flange and fall outside of the tray and into the trough 48.

The work of the machine may be regulated in several ways—by means of the feed-regulator plate or ring 42, adjusted by means of the weight 45, or by means of the lever 22 to raise or lower the shaft 12, in which case more or less material will be contained on the tray and consequently more or less will be discharged through the central opening, or by shifting the bearing for the upper shaft to change the center of the ring with respect to that of the tray. Action may be further varied by regulating the air-currents through manipulation of the deflector 64 or the adjustable ring 61, secured upon the upper edge of the outside wall of the trough 48, as shown in Figs. 1 and 5.

In a machine of the construction shown in Fig. 2, wherein the tray and ring are duplicated, the power of the supporting-weights of the tray may be increased, so that portions of the heavy material and clean stock will also be discharged down through the central opening of the first ring to be caught upon the lower tray. In such a machine the feed may be more rapid. I preferably provide in this construction an adjustable collar or sleeve 67 in the hood over the spirals to prevent material being drawn off the lower tray and down into the dust-collecting hopper. Where two or more trays and the eccentric therefor are employed, I preferably connect the two shafts by other means than that shown in Fig. 1 and also provide other means for yieldingly supporting the trays. For the latter purpose I employ the balancing-lever 68, providing upon the inner end thereof a head 69 to support the spindle 70 and therewith the weight of the trays and the material thereon. The spindle extends down through the hollow shaft 71, held on a long vertical bearing 75. The lower end of the spindle is attached to a sleeve or hub 72, slidable on a feather provided in the shaft 71. This sleeve has arms 73 extending out to support the upper tray, and depending-arms 74 extend down therefrom to support the lower tray. The upper and lower eccentric or agitating rings, which may also be vertical, as shown in this case, are supported upon the lower shaft, the same being provided with spider-arms 76, to which the lower ring is attached, while standards 77 extend upward from these arms to support the upper ring. The trays and the rings are connected with one another so as to be driven from the lower shaft by means of the ball-and-socket link 78, the ends of which are secured in lugs extending from the supports of the upper tray and the lower ring, respectively. The positions of these lugs will obviously be varied as the parts are rotated, the result being that the trays will be given a horizontally retarding and accelerating motion further tending to settle the heavy stock upon the trays.

In place of the simple lug extending down into the space between the ring or vertical flange of the tray, as shown in Fig. 1, I preferably employ a small inclined and outwardly-curved spout or trough 80, in connection with each of the trays, to take the material collecting at the outside thereof and throw it over into the hopper beneath. In addition, means are provided to raise and lower the spout as the tray is depressed or rises under the varying weight of the material thereon caused by a varying feed. For this purpose I employ the vertically-movable rod 81, extending through suitable bearings and adjustably attached at its upper end to the pivoted lever 82, which in turn is connected by an adjustable link 83 to the weight-lever which counterbalances the trays.

The device employed in Fig. 1 is shown in detail in Fig. 6, consisting in a simple lug rendered adjustable by means of the hand-wheel 83'. In Fig. 6 I have also shown a small annular trough provided at the outer edge of the tray for the purpose of giving the collecting-finger ample room when the tray rises and also to make a larger opening between the tray and ring to prevent choking.

The construction shown in Fig. 2 and relating to the support of the tray may be modified, as shown in Figs. 9 and 10, to the end that a vertical vibration may also be added to the tray. This is done by means of beveled pulleys or wheels, one of which is carried upon the adjustable step-lever 22 and the other upon the lower end of the shaft, one of the same being a cam or eccentric whereby as the shaft revolves the upper pulley will be alternately raised and lowered. As shown in Fig. 9, a simple pulley or wheel 88 is provided on the lever 22, while on the shaft an inclined pulley 89 is used, the same being practically hinged upon the shaft to connect the same thereto and the inclination of the pulley being made adjustable by means of set-screws 90, the opening within the boss or hub of the pulley being flared out at the top to permit the tilting of the pulley and sleeve thereon.

In Fig. 10 I have shown the pulley 88 as carried upon the cam or crank shaft 91, independently rotated. If desired, the power may be communicated to the machine through the employment of cone friction-pulleys at this point. The counterbalance for the tray is further modified from Fig. 1 by the employment of a single weight 92, Fig. 9, the ears of which are provided with slots to receive pins on the short levers 38, which at their outer ends are connected with the tray.

A further simple modification is illustrated in Fig. 11, where a single shaft is employed, the same being inclined with respect to the perpendicular and the tray being carried upon a universal joint 100, slidably secured on the shaft and operating against the cushioned spring 13. The ring is fixed securely upon the shaft itself or upon a sleeve keyed thereto and vertically adjustable thereon. When the shaft is rotated rapidly, the tray will, on the principle of gyration, assume a horizontal position and a position eccentric to the center of the ring.

Another modification is shown in Fig. 12, in which a single shaft is employed with the trays mounted thereon, and the upper end of the shaft being secured in the bearing mounted in the sliding support 101, said support being secured in standards 103 and connected by a pitman 105 to an eccentric 107 upon a shaft 109. This shaft is provided with a suitable pulley 111, by means of which power may be applied thereto, and through this means the upper end of the shaft is given a vibratory motion, the lower end of the shaft being supported in a suitable stop which permits such motion to the upper end. A wabbling motion may also be imparted to the shaft and various other modifications made in carrying out the principal idea.

It is obvious that the clean stock which is taken from the periphery of the tray may be subjected to a second cleaning operation upon another tray, which may be, if desired, in the same machine, the number of trays which may be employed being practically unlimited. It is desirable, however, when the machine is used for middlings, to make the separations as complete as possible in the the first place, and thus avoid many operations upon the stock, each of which tends to reduce the middlings in size. In fact, the principal advantage which my machine possesses over those previously devised for that purpose accrues from the fact that all clean sharp middlings, regardless of size, are precipitated upon the tray and carried out together, and thus separated from the branny particles they may all be reduced to flour at once without a repurification of any part thereof, which is usually found to be necessary. For middlings I preferably employ a vibratory movement, which gives the least friction to the stock, and in some instances I omit it altogether.

It is further obvious that my machine when used with wheat or like grain may combine the qualities of both a cleaner and a scourer. For this use the retaining wall or ring is thrown farther out of line with the tray, the greater degree of eccentricity causing a more powerful and pronounced agitation of the whole body of grain, causing the kernels to rub sharply together and against the eccentric ring, and thus thoroughly scouring each kernel. For different material I employ different modes of vibration and agitation.

A further advantage of my machine arises from the efficient use and peculiar direction of the air-currents, the fan and the dust-collector being combined in a compact form in the lower and otherwise unused portions of the casing. Another advantange lies in the the small power required to operate the machine, and, further, in the small floor-space occupied by the machine.

In using the machine of either form the following process is carried out: The grain, stock, or material to be operated upon is massed upon the tray or support, and the top of the mass assumes an inclined position. The agitation of the mass of material causes the lighter material to be brought to the top of the mass, and from there it slides down over the inclined surface of the mass and into the receptacle below. The heavier material passes out through the slot or opening at the bottom of the tray and is received in a suitable receptacle. The movement of the light material over the inclined surface of the mass may be facilitated by the action of the air-current when the same is used.

Having thus described my invention, I claim as new and desire to secure by Letters Patent—

1. The combination, with a supporting tray or plate, of a plate suspended above and angularly thereto, and means for feeding, accumulating and agitating the material on said tray or plate, whereby the heavier particles settling to the bottom of the mass are separated from the lighter by passing through the opening between the plates, while the lighter particles pass to a separate receiver.

2. The combination, with a separating plate or tray for supporting the material to be separated, said plate or tray having an open center, of a retaining ring or plate arranged above said supporting tray or plate and angularly thereto, and with a suitable opening between said tray and said ring, means for massing or accumulating the material upon said supporting plate or tray and against said retaining plate or ring, and means for agitating said material upon said supporting tray, whereby the heavier material will be brought to the bottom of the mass and will pass out of the opening between said tray and said ring, while the light material will be brought to the top of the mass and will slide over its surface into a separate receptacle.

3. The combination, with the supporting tray or plate 7 mounted upon suitable yielding supports, said tray or plate having an open center, of the ring or plate 15 arranged above said tray or plate 7, and at an angle thereto, with a suitable opening between said tray and said ring or plate, and means for moving said tray and said ring or plate, and thereby agitating the material supported and retained between said tray and said ring or plate, whereby the heavier material will be separated by being passed out through the opening between said tray and said ring or plate, while the light material is brought to the top of the mass and slides off the surface into a separate receptacle.

4. The combination, with the tray or plate 7 mounted upon yielding supports, said tray or plate having an open center and means for rotating said tray or plate, of a rotating ring or plate 15 arranged above said tray or plate 7, and angularly thereto, with an opening between the outer circumferences of said tray and said ring or plate, means for rotating said ring or plate 15, and means for feeding and massing the grain or material upon said tray 7 and against said plate 15.

5. The combination, with the supporting plate 7 and means for supporting and rotating said plate, of the retaining plate 15 arranged above said plate 7 and eccentrically and angularly thereto, means for rotating said plate 15, and means arranged within said plates for distributing and massing the material upon said plate 7 and against said plate 15.

6. The combination, with the angularly arranged plates 7 and 15, arranged with an opening between them at their outer circumferences, and means for rotating said plates, of a centrifugal feeder and distributer arranged to feed and mass the material upon said plate 7 and against said plate 15.

7. The combination, with the supporting ring or plate 7, means for yieldingly supporting said plate, and means for rotating said plate, of the retaining ring or plate 15 arranged above said plate 7 and at an angle thereto, and with an opening between said plates at their outer circumferences, and the rotating distributing plates 18 arranged to receive the material and to distribute it by centrifugal force upon said plate 7, for the purpose specified.

8. The combination, with the supporting ring or plate 7 having an open center, of the retaining ring 15 arranged above said supporting ring and angularly thereto and with a space between the outer circumferences of said rings, the rotating distributing plates 18 and 20 arranged within said plates, and means for automatically feeding the material to said distributing plates.

9. The combination, with the rotating, yielding ring or plate 7, of the rotating ring or plate 15 arranged at an angle thereto with an open space between the outer circumferences of said rings, the casing, and means for creating a downward current of air over the surface of the material supported on said ring 7.

10. The combination, with the rotating, yielding ring or plate 7 having an open center, of the rotating retaining ring 15 arranged above and at an angle to said ring 7, a casing surrounding and inclosing said rings or plates, and means for creating an air belt or continuous current of air within said casing and causing said air current to pass through the material being in the process of distribution on said rings 7 and 15.

11. The combination, with the rotating, yielding supporting ring or plate 7 having an open center, the trough surrounding said plate, a receptacle also surrounding said plate, means for discharging the material from said trough into said receptacle, a retaining ring or plate 15 arranged above said ring 7 and angularly thereto, and a receptacle beneath said ring 7 for catching the light material that is discharged through the center of said ring 7.

12. The combination, with the rotating, yielding ring or tray 7, the trough surrounding said tray, the finger for removing the material from said trough, the retaining and agitating ring 15 arranged above the tray 7 with a narrow space between the outer circumferences of said trays, the trough 48 for receiving the material that passes between said trays, and means for massing the material upon the tray 7.

13. The combination, with the casing, of the upper and lower shafts arranged out of line with each other and connected together by a universal coupling, the tray 7 supported on said lower shaft, and the ring 15 supported upon said upper shaft.

14. The combination, with the casing, of the upper and lower shafts arranged out of line with each other and connected by a universal coupling, the adjustable stop supporting said lower shaft, means for driving said shafts, the ring or tray 7 connected to said lower shaft, the ring 15 connected to the upper shaft, and a centrifugal distributer for massing the material upon said tray 7 beneath said ring 15, for the purpose specified.

15. The combination, with the casing, of the upper and lower shafts arranged out of line with each other, the tray supported upon said lower shaft, the ring 15 supported upon the upper shaft, means for rotating said shafts, a casing inclosing said tray and ring, and means for creating in said casing an air belt and causing the air to pass downward over the material on said tray, and means for separating the dust from said air, substantially as described.

16. The combination, with a supporting tray or plate, of a plate suspended above and angularly thereto, means for feeding accumulating and agitating the material on said tray or plate, whereby the heavier particles settling to the bottom of the mass are separated from the lighter by passing up through the opening in the plates, while the lighter particles pass to a separate receiver, and means for passing a current of air through said material as it falls upon said plate, substantially as described.

17. The combination, with a suitable casing, of a rotatable shaft arranged within the same, a centrally pierced or open disk mounted upon said shaft, a rotatable ring arranged above and at an angle to said disk, means for feeding and distributing material upon said disk and against said ring, means for rotating, separating and discharging the material from the same, an annular air trunk communicating with the distributing and discharging passages, rotating blades for creating a continuous air current within said trunk and through said passages, and a rotating spiral plate for collecting and discharging the light material floated by said current, substantially as described.

18. The combination, with a rotatable, vertical shaft, and a centrally pierced open disk or tray mounted upon said shaft, of a rotatable ring arranged above and at an angle to said disk, means for rotating said ring independently from said disk, means for distributing and accumulating material upon said disk and against said ring, a discharge outlet for the heavier material between said disk and said ring, and means for separating and discharging the lighter material through the open center of said disk, substantially as described.

19. The combination, with a suitable casing, of a rotatable vertical shaft within the same, a centrally pierced or open separating disk or tray mounted upon said shaft, a rotatable retaining and separating ring arranged above and at an angle to said disk, a feed hopper, an adjustable ring embracing the outlet of said hopper, a rotating plate arranged beneath said ring, a series of step rings surrounding said plate and adapted to deliver and distribute material upon the separating disk or tray, an annular discharge outlet for the heaviest material between said disk or tray and said retaining ring, means for separating and discharging the lighter material through the center of said tray or disk and conducting it out of the machine, and means for discharging the heavier material through the opening between said disk and said retaining ring, substantially as described.

20. The combination, with a stationary inlet hopper, and a horizontally rotating distributing plate or disk beneath the same, of an annular plate or ring arranged within the said hopper and adapted to receive and sustain the material within the same, a ring or annular feed gate embracing the outlet of said hopper, a pivoted lever provided with a yielding adjustable counterbalance device, and connections between said lever and said supporting ring and feed gate, whereby the gravitating pressure of the material in the feed hopper upon the sustaining ring forces the feed gate away from the distributing plate, substantially as described.

21. The combination, with a rotating disk, having an annular peripheral ring or trough, a rotating ring arranged within said rim at an angle to said disk, and an annular opening between said disk and said ring, of a stationary adjustable finger or deflector arranged between said ring and the rim of said disk, a rotating distributing plate adapted to deliver and distribute material against said disk and ring, a feed hopper arranged above said rotating plate, an annular feed sustaining ring within said hopper, a ring or annular feed gate embracing the outlet of said hopper, a pivoted lever provided with an adjustable counterbalancing device and adjustable connections between said lever and feed sustaining ring and feed gate and deflector, whereby the gravitating pressure of the material in the hopper upon the feed sustaining ring simultaneously imparts a vertical movement to said feed gate and said deflector, substantially as described.

22. The combination, with the supporting disk, having a central discharge opening, of the retaining plate or wall suspended above and angularly thereto, means for feeding and accumulating material on said disk and against said wall, means for discharging a part of the material through the opening between the disk and the plate, and means for rapidly rotating the said disk and plate, whereby the heavier material is thrown out through the slot between the disk and the ring by centrifugal force and gravity, while the surplus stock constituting the lightest material is discharged through the central opening, substantially as described.

23. The combination, with the supporting disk, having a central discharge opening, of the retaining plate or wall suspended above and angularly thereto, means for feeding and accumulating material upon said disk and against said wall, means for agitating the material on said disk, means for discharging a part of the material through the opening between the disk and the plate, and means for rapidly rotating the said disk and plate, whereby the heavier material is thrown out through the slot between the disk and the ring by centrifugal force and gravity, while the surplus stock constituting the lightest material is discharged through the central opening, substantially as described.

In testimony whereof I have hereunto set my hand this 26th day of June, A. D. 1894.

JAMES JESSEN.

In presence of—
  A. C. PAUL,
  M. E. GOOLEY.